March 14, 1967  W. E. JAMES  3,308,926
POWER TAKE-OFF DEVICE FOR BALE THROWER
Filed May 25, 1966  3 Sheets-Sheet 1
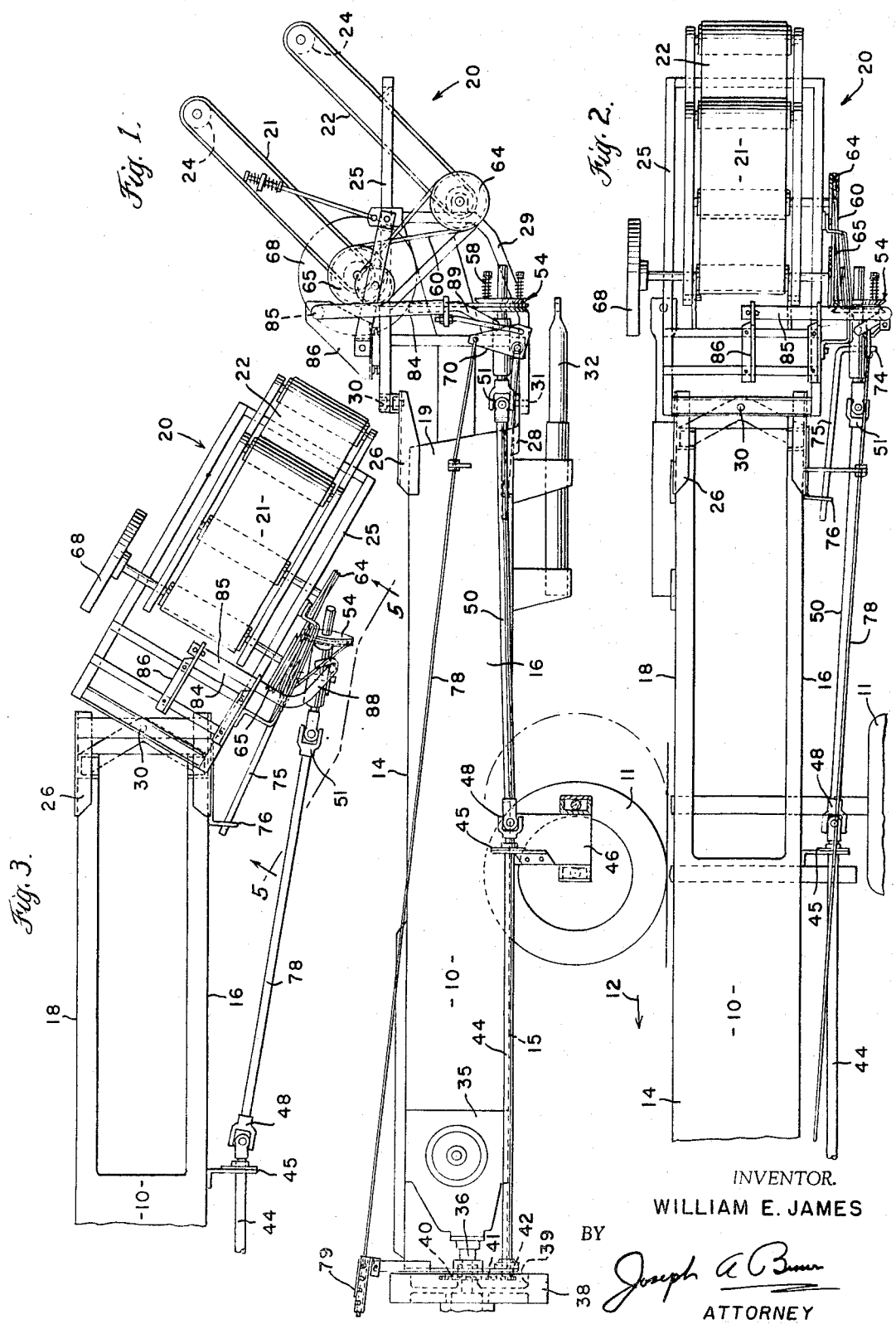
INVENTOR.
WILLIAM E. JAMES
BY
Joseph A. Bruner
ATTORNEY INVENTOR.
WILLIAM E. JAMES
BY
*Joseph A. Brown*
ATTORNEY March 14, 1967  W. E. JAMES  3,308,926
POWER TAKE-OFF DEVICE FOR BALE THROWER
Filed May 25, 1966  3 Sheets-Sheet 3

INVENTOR.
WILLIAM E. JAMES
BY
Joseph A. Brown
ATTORNEY

United States Patent Office 3,308,926
Patented Mar. 14, 1967

3,308,926
POWER TAKE-OFF DEVICE FOR BALE THROWER
William E. James, Dijon, France, assignor to Sperry Rand Corporation, New Holland, Pa., a corporation of Delaware
Filed May 25, 1966, Ser. No. 552,892
10 Claims. (Cl. 198—128)

This invention relates generally to devices for throwing hay bales from balers to trailing wagons. More particularly, the invention relates to an improved arrangement for driving a bale thrower, including a power-take-off connection to the baler on which the thrower is carried.

Conventionally, a bale thrower is constructed to be mounted on a baler for lateral movement relative thereto so that trajected bales will be thrown into a trailing wagon regardless of the position of the baler relative to the wagon. Providing power for a thrower which is laterally adjustable is easily accomplished when an engine is used and mounted on the thrower, because then the engine swings with the thrower when the thrower shifts laterally and the drive elements remain in the same relative positions. However, when the thrower is driven by a power take-off connection to the baler, problems are introduced because the power source is fixed and the driven components are shiftable relative to it.

One power take-off arrangement presently in use is shown in Patent No. 3,110,392. A belt around a baler flywheel drives a shaft having a belt connection to a pair of split sheaves carried on the thrower for varying thrower speeds. Ratchet control means is provided for opening and closing the split sheaves. Such structure extends above the bale case and has an effect upon the appearance of the baler and the thrower. Also, since the drive utilizes the periphery of the baler flywheel, the arrangement is not usable when the baler is driven by a separate engine on the baler and not by a connection to the tractor which tows it. This is because when the baler is operated by a separate engine, the engine connects to the baler through a belt extending around the flywheel, thereby preventing the use of the flywheel periphery for a bale thrower drive belt.

One object of this invention is to provide an improved drive for a bale thrower where the drive is of the power take-off type.

Another object of this invention is to provide a power take-off bale thrower drive which is designed to employ only a single split sheave for varying thrower speeds and is otherwise of a simpler less costly construction.

Another object of this invention is to provide a bale thrower drive of the character described which is so located relative to the baler on which it is operable that it does not detract from the general appearance of the baler.

A further important object of this invention is to provide a power take-off drive for a bale thrower, which drive is so constructed that it may be used on any type or design of baler, such as engine driven or a baler which is powered from the tractor which tows it.

A still further object of this invention is to provide a bale thrower power take-off drive which is so constructed that the components do not impair or interfere with the normal lateral swinging and steering of the thrower.

Other objects of this invention will be apparent hereinafter from the specification and from the recital in the appended claims.

In the drawings:

FIG. 1 is a fragmentary side elevation of the bale case portion of a baler having mounted thereon a bale thrower driven by a power take-off drive constructed according to this invention;

FIG. 2 is a fragmentary plan view of FIG. 1 with the thrower shown in a central position;

FIG. 3 is a view similar to FIG. 2 and showing the thrower pivoted laterally to the left relative to ground travel and showing the bale thrower drive components shifted relative to each other;

Figure 4:
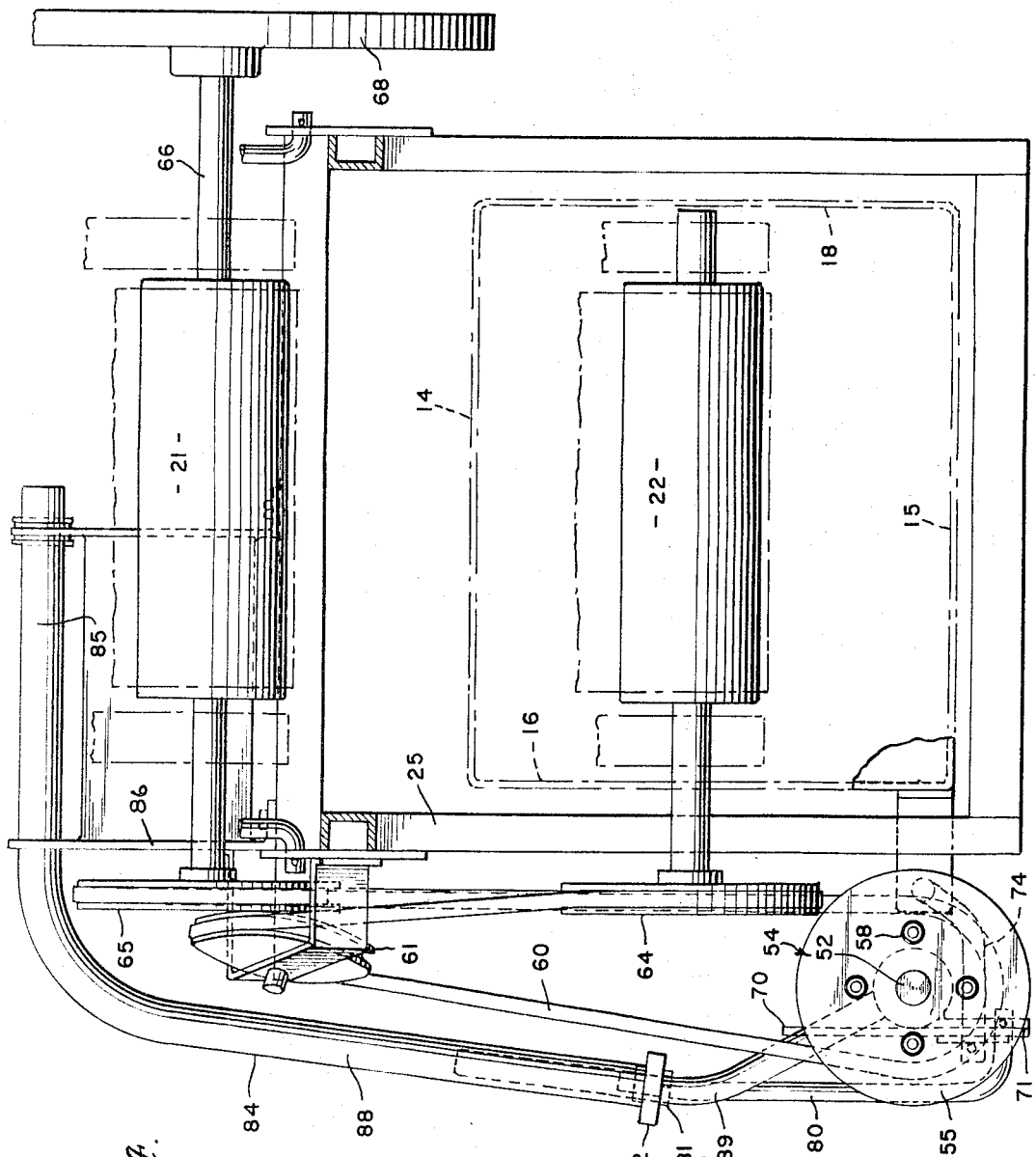
Figure 5:
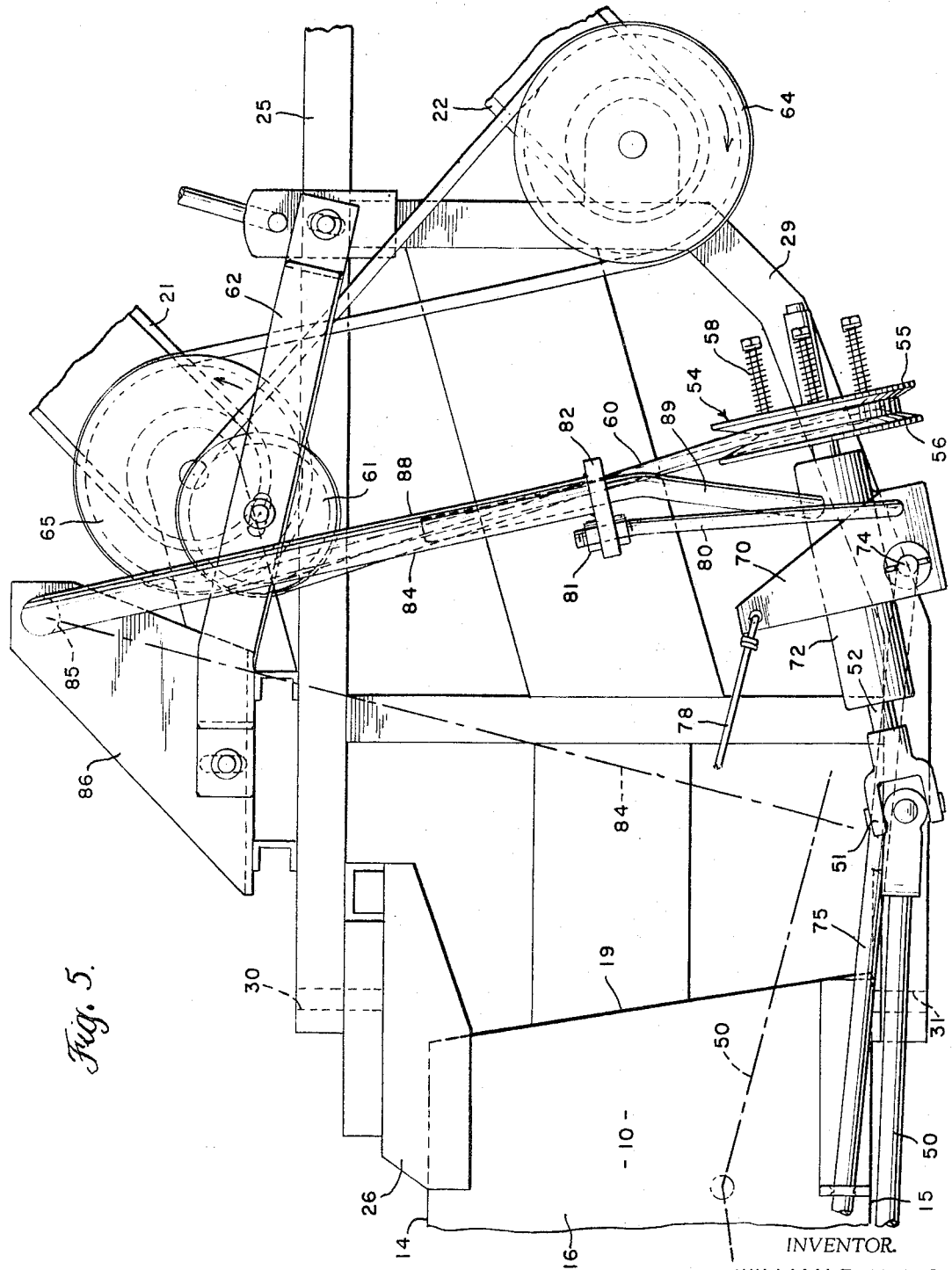

FIG. 4 is an enlarged end view looking toward the left in FIG. 1 with the bale case, bale thrower and framework diagrammatically illustrated in dot-dash lines; and FIG. 5 is an enlarged fragmentary elevational view taken generally on the lines 5—5 of FIG. 3 looking in the direction of the arrows and showing the relative positions of the parts of the drive mechanism in full lines when the bale thrower is swung to the position of FIG. 3 and with the center line of parts of the drive mechanism indicated in dot-dash lines in the positions they assume when the bale thrower is swung to the right and in a direction opposite to that of FIG. 3.

Referring now to the drawings by numerals of reference, and particularly to FIGS. 1–3, 10 indicates generally the bale case of a hay baler. Bale case 10 is supported on ground wheels, one of which is shown at 11, and the case extends in a fore-and-aft direction relative to ground travel as indicated by the arrow 12, FIG. 1. The bale case has a top wall 14, a bottom wall 15 and side walls 16 and 18. It is rectangular in cross section and hay delivered into the forward section thereof is compressed into bales and the bales move progressively rearwardly through the bale case for discharge through end 19. The particular structure for forming the bales and progressively moving them rearwardly is conventional and therefore is not described here. An arrangement as shown in Patent No. 3,115,823 may be used, for example.

Mounted on bale case 10 to receive each bale discharged therefrom and to traject it to a trailing wagon is a bale thrower generally indicated at 20. The bale thrower comprises rotatable bale trajecting means in the form of a pair of spaced belts 21 and 22 which travel at high speeds and in opposite directions to traject a bale discharged into the space between the belts. As shown in FIG. 1, the belts extend in an upward rearward direction and they are rotatably supported on rollers 24. The belts are so spaced that belt 22 engages the bottom of each bale and belt 21 engages the top.

The bale trajecting means is carried on a thrower frame structure 25 including brackets 26 which connect to the top 14 of bale case 10 and brackets 28 which are affixed adjacent bottom 15. The thrower frame structure includes a plate 29 which constitutes a continuation of the bottom of the bale case. Plate 29 curves upwardly and rearwardly as shown in FIG. 1 to direct bales to the passage defined by belts 21 and 22. In general, the bale trajecting means is constructed as shown in U.S. Patent No. 3,132,754.

In order that discharged bales will be trajected to a trailing wagon during the making of a turn, bale thrower 20 is mounted on bale case 15 for lateral shifting and swinging movement relative thereto. The thrower framework 25 is connected to brackets 26 and 28 by vertically aligned pivot pins 30 and 31 located, respectively, above and below the discharge end of the bale case. The means for causing the bale thrower to swing laterally relative to bale case 10 is not shown. However, the steering is intended to be accomplished by a steering arm connection to the tongue of the wagon being towed by the baler. The wagon hitch is shown at 32 in FIG. 1. The details of the steering arrangement may be similar to that shown in U.S. Patent No. 3,055,519.

For driving and powering bale thrower 20, there is a power take-off connection to the baler. At the forward end of bale case 10, there is a gearbox 35 having an output shaft 36 which rotates a flywheel 38. The flywheel has an inner recess 39 to receive a drive sprocket 40 connected by a chain 41 to a driven sprocket 42 keyed to a forward end of a drive shaft section 44. Shaft section 44 extends rearwardly along the corner formed by side wall 16 and the bottom wall 15 of bale case 10 to a medial location where it is supported on a bracket 45 on support member 46. At its rearward terminal end, shaft 44 has one half of a universal joint 48. The other half of the joint is connected to a universal shaft 50 which extends rearwardly and terminates in a second universal joint 51. Joint 51 connects to a shaft section 52 which transmits power to a split sheave 54 having a slidable half 55 movable toward and away from fixed half 56. Sheave half 55 is biased toward a closed position against half 56 by springs 58.

Extending around split sheave 54 is an endless drive belt 60 which first passes around an idler 61 mounted on a bracket 62 on the thrower frame 25. The variable speed sheave 54 is located in a plane generally adjacent the bottom 15 of bale case 10 and idler 61 is located vertically spaced from the sheave and above top wall 14 of the bale case. Belt 60 also extends around a driven sheave 64 for lower thrower belt 22 and around a sheave 65 for upper belt 21. When viewed as shown in FIGS. 1 and 5, sheave 64 rotates in a clockwise direction and sheave 65 rotates counterclockwise. The shaft 66 (FIG. 4) for sheave 65 carries a flywheel 68 at its end opposite the location of sheave 65.

For varying the output speed of the split sheave 54, a control plate 70 is provided and carried on tabs 71 welded to and projecting downwardly from sleeve 72 on shaft 52. Control plate 70 is pivotal on one end 74 of an L-shaped guide rod 75. End 74 projects through suitable holes in the tabs 71. The guide rod extends generally in a fore-and-aft direction along the side wall 16 of a bale case 10 and its forward free ends slidably projects through a bracket 76 projecting outwardly from the bale case. Guide rod 75 is so located relative to the bale case and bale thrower and to split sheave 54 that it maintains the sheave properly oriented relative to these components when the thrower shifts laterally. Control plate 70 is pivoted by means of a cable 78 which extends along the side 16 of bale case 10 and terminates at its forward end in a latching device 79 whereby the cable may be pulled or released and then locked in desired position.

The lower rearward end of control plate 70 (FIG. 5) has affixed to it a rod 80 which extends in a vertical direction and is connected by nuts 81 to a plate 82 welded to the lower end of a carrier arm 84. The carrier arm has a transverse horizontal section 85 (FIG. 4) rotatably supported on upstanding brackets 86 on the thrower frame. Carrier arm 84 also has a downwardly extending tubular section 88 into which a rod 89 is telescopically received. Rod 89 has its lower end affixed to the sleeve 72 of drive shaft 52.

When control plate 70 is pivoted in a counterclockwise direction, FIGS. 1 and 5, the upward force directed through rod 80 to plate 82 on carrier arm 84 produces a downward force on rod 89 and split sheave 54. This force causes the halves 55 and 56 to open against the resistance of springs 58 and reduces the effective diameter of the sheave thereby changing the speed of belt 60. In turn, this changes the speed of belts 21 and 22. When the control plate 70 has been so pivoted, it must be held in adjusted position by the ratchet control means 79 at the front end of the baler. When cable 78 is released, however, the springs 58 become effective and parts return to their normal position with the sheave halves 55 and 56 closed.

In FIGS. 1 and 2, split sheave 54 is shown in the normal position that it occupies when bale thrower 20 is in a neutral or central position to throw bales directly rearwardly of the baler. It will be noted that section 88 of carrier arm 84 extends generally vertical. However, when thrower 20 is pivoted laterally to the left as shown in FIGS. 3 and 5, sheave 54 is pivoted upwardly. At the same time, carrier arm 84 pivots whereupon the vertically extending section 88 to a rearward position. When the thrower is pivoted to the opposite side of the bale case from that shown in FIG. 3, section 88 of carrier arm 44 swings to the forward dotted line position shown in FIG. 5 and split sheave 54 pivots downwardly. The amount of forward movement of arm 84 and downward movement of sheave 54 is about equal and opposite to the upward and rearward movement of these parts when the thrower is swung to the opposite side. In both lateral positions of the thrower, that is left or right, universal shaft 50 swings freely upwardly or downwardly from its normal position to accommodate the drive to the lateral position of the thrower.

The structure described is somewhat less complicated and costly than arrangements of prior design. The location of the drive components being along the bottom of the bale case do not detract from the baler appearance. Since the initial drive is from the inside of the flywheel and not from the periphery, the flywheel 38 is left free for connection to an engine for driving the baler if such arrangement is desired. As a result, the particular power take-off drive structure shown can be used on any type or model of baler. Further, only one variable sheave is used and the control elements for operating the sheave are simply designed.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A bale thrower for receiving and trajecting bales after they emerge from the rearward discharge end of a fore-and-aft extending bale case of a baler, comprising rotatable bale trajecting means, support means connecting said trajecting means to said bale case for lateral pivotal movement relative thereto to vary the direction in which bales are trajected, a variable speed drive sheave, means connecting said drive sheave to said trajecting means, means for opening and closing said drive sheave to vary the speed of said trajecting means, a universal shaft having one end pivotally connected to said drive sheave and through which power is supplied to the sheave, means pivotally connecting an opposite end of said universal shaft to said bale case, a carrier arm pivotally connected to said support means, and means linking said carrier arm to said drive sheave and to said universal shaft to pivot said shaft relative to said bale case and the shaft and sheave relative to each other and to the carrier arm when said support means is moved laterally relative to said bale case.

2. A bale thrower as recited in claim 1 wherein said universal shaft and said drive sheave are located in a plane adjacent a bottom wall of said bale case, and said carrier arm is pivoted above a top wall of the bale case.

3. A bale thrower as recited in claim 2 wherein said carrier arm is pivotal about a generally horizontal transverse axis and has a section which extends along side said trajecting means in a normal vertical direction when said thrower is in a position generally coextensive with said bale case, said carrier arm, linking means, universal shaft and drive sheave being so related that when the thrower moves laterally in one direction said carrier arm section swings rearwardly and when the thrower moves laterally in the opposite direction said carrier arm section swings forwardly.

4. A bale thrower as recited in claim 1 wherein said drive sheave includes spring means normally urging separate halves of the sheave toward each other.

5. A bale thrower as recited in claim 4 wherein said means connecting said drive sheave to said trajecting means comprises an idler carried on said supporting means and a belt extending around the sheave and idler, and said carrier arm and linking means changing the location of the drive sheave relative to said idler.

6. A bale thrower as recited in claim 5 wherein a control plate is provided to open and close said drive sheave, means pivotally mounting said control plate on said thrower support means, and means operatively connecting said control plate to said carrier arm.

7. A bale thrower as recited in claim 6 wherein the means connecting said control plate to said carrier arm comprises a rod fixedly connected between the parts, and a second rod telescopically received in said carrier arm and having an opposite end affixed to said means connecting said universal shaft to said drive sheave.

8. A bale thrower as recited in claim 6 wherein cable means is connected to said control plate to adjust the pivoted position thereof.

9. A bale thrower as recited in claim 1 wherein a guide rod slidably connects said drive sheave to said bale case to retain said sheave properly oriented relative to said universal shaft.

10. A bale thrower as recited in claim 9 wherein the control plate for regulating said drive sheave is pivotally supported on said guide rod.

References Cited by the Examiner
UNITED STATES PATENTS
806,803    12/1905    Hamilton _____ 198—95

EVON C. BLUNK, *Primary Examiner.*

R. E. AEGERTER, *Assistant Examiner.*